(12) United States Patent
Palanchoke et al.

(10) Patent No.: US 9,297,939 B2
(45) Date of Patent: Mar. 29, 2016

(54) SPECTRAL FILTERING DEVICE IN THE VISIBLE AND INFRARED RANGES

(71) Applicant: COMMISSARIAT A L'ENERGIE ATOMIQUE ET AUX ENE ALT, Paris (FR)

(72) Inventors: Ujwol Palanchoke, Saint Martin D'Heres (FR); Salim Boutami, Grenoble (FR); Jerome Hazart, Eybens (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 150 days.

(21) Appl. No.: 13/950,691

(22) Filed: Jul. 25, 2013

(65) Prior Publication Data

US 2014/0049812 A1 Feb. 20, 2014

(30) Foreign Application Priority Data

Aug. 16, 2012 (FR) ...................................... 12 57823

(51) Int. Cl.
*G02B 5/20* (2006.01)
*F21V 9/04* (2006.01)
*B82Y 20/00* (2011.01)

(52) U.S. Cl.
CPC ................. *G02B 5/208* (2013.01); *B82Y 20/00* (2013.01); *G02B 5/203* (2013.01); *G02B 5/201* (2013.01); *G02B 2207/101* (2013.01)

(58) Field of Classification Search
CPC .......... G02B 5/20; G02B 5/204; G02B 5/206; G02B 5/207; G02B 5/208; G02B 2207/101; B82Y 20/00
USPC ................... 359/359–360, 585–590; 977/700
See application file for complete search history.

(56) References Cited

U.S. PATENT DOCUMENTS 5,373,182 A * 12/1994 Norton ................ H01L 27/1446
257/440
7,915,652 B2 * 3/2011 Lee .................... H01L 27/14609
257/291

(Continued)

FOREIGN PATENT DOCUMENTS

EP            2 367 359 A2    9/2011
WO    WO 2011/139785 A2   11/2011
WO    WO 2012/032939 A1    3/2012

OTHER PUBLICATIONS

Frey, et al., "Color filters including infrared cut-off integrated on CMOS image sensor," Optics Express, vol. 19, No. 14, Jul. 4, 2011, pp. 13073-13080.*

(Continued)

*Primary Examiner* — Thomas K Pham
*Assistant Examiner* — Nicholas R Pasko
(74) *Attorney, Agent, or Firm* — Oblon, McClelland, Maier & Neustadt, L.L.P.

(57) ABSTRACT

Spectral filtering device including a dielectric substrate, a first filter capable of acting as a passband filter in the visible range and having a plurality of first nanostructures with a uniform spacing between each other. Each nanostructure has a portion of dielectric material arranged between two portions of metallic material such that one of the two portions of metallic material is arranged between the substrate and the portion of dielectric material. A second filter capable of acting as a passband filter in the infrared range is also included having a plurality of second nanostructures with a uniform spacing between each other and each comprising a portion of dielectric material of which only one face is in contact with a portion of metallic material.

17 Claims, 9 Drawing Sheets

(56) References Cited

U.S. PATENT DOCUMENTS

| | | | | |
|---|---|---|---|---|
| 2006/0147617 | A1* | 7/2006 | Chen | G02B 5/201 427/162 |
| 2006/0262250 | A1* | 11/2006 | Hobbs | G02B 5/1809 349/96 |
| 2010/0059663 | A1* | 3/2010 | Desieres | G01J 3/02 250/226 |
| 2010/0091225 | A1* | 4/2010 | Cho | G02B 1/005 349/105 |
| 2011/0170042 | A1* | 7/2011 | Cho | G02F 1/133514 349/106 |
| 2011/0216229 | A1* | 9/2011 | Mary | B82Y 20/00 348/273 |
| 2011/0285942 | A1* | 11/2011 | Guo | G02B 5/008 349/96 |
| 2012/0086887 | A1* | 4/2012 | Lee | G02B 5/3058 349/62 |
| 2012/0268809 | A1* | 10/2012 | Guo | G02F 1/216 359/359 |
| 2012/0287362 | A1* | 11/2012 | Hashimura | G02F 1/133528 349/15 |
| 2014/0034835 | A1* | 2/2014 | Frey | G01J 1/0437 250/349 |

OTHER PUBLICATIONS

Diest, et al., "Tunable color filters based on metal-insulator-metal resonators," Nano Letters, vol. 9, No. 7 (2009), pp. 2579-2583.*

Guo, et al., "Nanostructured metal-insulator-metal resonators for high-resolution color filtering and spectral imaging," Photonic and Phononic Properties of Engineered Nanostructures, Proc. of SPIE vol. 7946, 794621 (2011).*

Tang, et al., "Single-layer metallodielectric nanostructures as dual-band midinfrared filters," Applied Physics Letters, 92, 263106 (2008).*

French Preliminary Search Report issued Feb. 15, 2013, in French 1257823, filed Aug. 16, 2012 (with English Translation of Categories of Cited Documents).

Ting Xu, et al., "Plasmonic nanoresonators for high-resolution colour filtering and spectral imaging", Nature Communications, vol. 1, 2010, pp. 1-5.

Shinzo Koyama, et al., "A Day and Night Vision MOS Imager With Robust Photonic-Crystal-Based RGB- and-IR", IEEE Transactions on Electron Devices, vol. 55, No. 3, Mar. 2008, pp. 754-759.

* cited by examiner

SPECTRAL FILTERING DEVICE IN THE VISIBLE AND INFRARED RANGES

TECHNICAL FIELD

This document relates to the fields of spectral filtering devices, used for example in imaging device or image sensors, and capable of filtering in the visible and infrared ranges, and particularly the near infrared.

PRIOR ART

There are many applications for optical filters for use in the fields of optical and photonic systems, for example in the field of imaging devices or image sensors, optical fibre communication systems, display systems or gas detection systems.

Optical filters may be of the passband, notch, low-pass or high-pass type. Such filters may function by reflection or by transmission of specific wavelengths ranges.

Imaging devices functioning in the visible range usually make use of transmissive colour filters (each transmitting a range of wavelengths corresponding to the colour of the filter) arranged as a Bayer matrix so that photodiodes arranged facing these filters can detect red, green and blue colours within different pixels. Each photodetector or pixel is associated with one of these filters. Different types of optical filters can be used to form this Bayer matrix, such as coloured organic resins doped by a colouring agent or pigments, or thin layer multi-layer filters.

These imaging devices usually use an infrared notch filter to reduce disturbances caused by infrared light at the photodetectors that will capture light in the visible range.

For some applications such as diurnal and nocturnal surveillance, it is useful to have a single sensor that can capture light in the visible range (during the day) and in the infrared range (during the night). However with this type of sensor, it is no longer possible to use an infrared notch filter because the infrared light must be captured by specific pixels of the sensor. For example, document EP 2 367 359 A2 discloses the making of such sensor that comprises a modified Bayer matrix including RGB (Red-Green-Blue) pixels that will capture light in the visible range and IR pixels that will capture light in the infrared range.

Such a device has the disadvantage that it makes use of a specific filter (called an <<IR notch filter>>) to filter wavelengths at the interface between the visible range and the infrared range to be captured. Furthermore, RGB filters do not filter infrared light. Therefore, post-processing is necessary after data capture to subtract information related to the infrared from the captured RGB data. Finally, the achievable pixel density and miniaturisation of filters in such devices are limited.

SUMMARY OF THE INVENTION

Thus there is a need to propose a spectral filtering device capable of simultaneously filtering in the visible and infrared ranges, that can for example be used with a single light sensor and that can give good spectral separation independently of the polarisation of the received light, and that when used within an imaging device, can directly obtain the required spectral information without the need for post-processing after data capture.

To achieve this, one embodiment discloses a spectral filtering device comprising at least:

a substrate comprising at least one dielectric material;

a first filter capable of acting as a passband filter in the visible range and comprising a plurality of first nanostructures with a uniform spacing between each other and arranged on the substrate, each of the first nanostructures comprising a portion of dielectric material arranged between two portions of metallic material such that one of the two portions of metallic material is arranged between the substrate and the portion of dielectric material;

a second filter capable of acting as a passband filter in the infrared range and comprising a plurality of second nanostructures with a uniform spacing between each other and arranged on the substrate, each of the second nanostructures comprising a portion of dielectric material of which only one face is in contact with a portion of metallic material.

The spectral filtering device is capable of filtering light in the visible range and in the infrared range, independently of the state of polarisation of received light. This filtering of light is made independent of polarisation due to the use of uniformly spaced nanostructures arranged on the substrate.

The spectral filtering device can also filter in the visible and infrared ranges within a single filtering structure, for example that can be integrated together with a single light sensor, due to the fact that the nanostructures in the first and the second filter are arranged on the same substrate.

Furthermore, the spectral filtering device does not require the use of an additional filter to stop infrared light at the first filter because each of the first nanostructures comprises two metallic portions that perform this infrared notch filtering.

Another advantage of the spectral filtering device is that it can be made using materials compatible with CMOS manufacturing methods used for example for making an image sensor, and therefore can be made using CMOS compatible steps of the same nature as steps used for example to make the image sensor with which the spectral filtering device will be coupled.

Finally, such a spectral filtering device is also tolerant to the angle of incidence at which light enters the spectral filtering device. This tolerance may correspond to a variation of about 30° around a zero angle of incidence (or about 20° when the filters are covered with a $SiO_2$ layer and when this angle is measured inside this $SiO_2$ layer).

Each of the second nanostructures comprises a portion of dielectric material of which only one face is placed in contact with a portion of metallic material. Thus, each of the second nanostructures may comprise a portion of dielectric material placed in contact with a single portion of metallic material. This configuration of the second nanostructures of the second filter enables to increase the transmission rate of the filter and to have immunity to angle of incidence of the light, this immunity also applied for the whole spectral filtering device.

The filters, especially the first and the second filters, of the spectral filtering device are made on the same substrate and can thus have portions of metallic material made from a same metal layer.

The portions of metallic material of the first and the second nanostructures may comprise aluminium and/or may be between about 30 nm and 70 nm thick. When each of the second nanostructures comprises a portion of dielectric material of which only one face is in contact with a portion of metallic material, these portions of metallic material may comprise aluminium. In this case, the use of two portions of aluminium in the first nanostructures can actually stop wavelengths in the infrared range and particularly in the near-infrared, in the first filter due to the strong absorption of infrared wavelengths by aluminium. Furthermore, due to the fact that in this case, each of the second nanostructures only comprises a single portion of aluminium, the absorption of infrared wavelengths by aluminium in the second filter is reduced.

The second filter may be capable of acting as a passband filter in the near infrared range.

The dielectric portions of the first and second nanostructures may comprise SiN and/or each of the dielectric portions of the first nanostructures may be between about 75 nm and 100 nm thick and/or each of the dielectric portions of the second nanostructures may be between about 250 nm and 325 nm thick.

The portions of metallic material arranged in contact with portions of dielectric material of the second nanostructures may be arranged between the substrate and said portions of dielectric material. In another variant, the portions of dielectric material of the second nanostructures may be arranged between the substrate and portions of metallic material.

The spectral bands (in the visible and infrared ranges) to be filtered by filters in the device may be configured by choosing lateral dimensions of the nanostructures in the filter, and their layout on the substrate, and their spacing.

One dimension of each of the first nanostructures that is perpendicular to a principal plane of the substrate, in other words the thickness of each of the first nanostructures, may be less than the shortest wavelength of the spectral band that the first filter can allow to pass, and/or one dimension of each of the second nanostructures that is perpendicular to the principal plane of the substrate, in other words the thickness of each of the second nanostructures, may be less than the shortest wavelength of the spectral band that the second filter can allow to pass.

The first nanostructures and/or the second nanostructures may each be rectangular parallelepiped shaped, or cuboid in shape, possibly with rounded corners.

The first nanostructures and/or the second nanostructures may be laid out side by side on the substrate, within their corresponding filters, in the form of rows parallel to each other.

Thus, the first nanostructures and/or the second nanostructures may be laid out side by side on the substrate, within their corresponding filters, in the form of a rectangular or staggered matrix.

When each of the first nanostructures is rectangular parallelepiped shaped, the ratio between a dimension of one side of a first nanostructure parallel to a principal plane of the substrate and the distance between the centres of two neighbouring first nanostructures located in the same row may be between about 0.4 and 0.95, and/or in which, when each of the second nanostructures is rectangular parallelepiped shaped, the ratio between a dimension of one side of a second nanostructure parallel to a principal plane of the substrate and the distance between the centres of two neighbouring second nanostructures located in the same row may be between about 0.4 and 0.95.

The distance between the centres of two neighbouring first nanostructures may be less than the shortest wavelength of the band that the first filter can allow to pass, and/or the distance between the centres of two neighbouring second nanostructures may be less than the shortest wavelength of the band that the second filter can allow to pass.

The spectral filtering device may also comprise a third filter capable of acting as a passband filter in the visible range and possibly comprising a plurality of third nanostructures at a uniform spacing from each other and located on the substrate, each of the third nanostructures possibly comprising a portion of dielectric material arranged between two portions of metallic material such that one of the two metallic portions is arranged between the substrate and the portion of dielectric material, the band of wavelengths that the third filter can allow to pass possibly being different from the band of wavelengths that the first filter can allow to pass.

The spectral filtering device may also comprise a fourth filter capable of acting as a passband filter in the visible range and possibly comprising a plurality of fourth nanostructures at a uniform spacing from each other and arranged on the substrate, each of the fourth nanostructures possibly comprising a portion of dielectric material arranged between two portions of metallic material such that one of the two metallic portions is arranged between the substrate and the portion of dielectric material, the band of wavelengths that the fourth filter can allow to pass possibly being different from the band of wavelengths that the first and third filters can allow to pass.

In one advantageous embodiment, the bands of wavelengths that the first, third and fourth filters can allow to pass may correspond to the colours red, green and blue.

The spectral filtering device may also comprise a layer of dielectric material covering the nanostructures arranged on the substrate. Such a layer of dielectric material forms a superstrate covering the nanostructures of the device.

Another embodiment relates to an imaging device comprising at least one spectral filtering device like that described above, and may also comprise a plurality of photodetectors each facing a filter of the spectral filtering device.

Another embodiment relates to a method of making a spectral filtering device, comprising at least the following steps:
  make a plurality of first nanostructures at a uniform spacing from each other on a substrate comprising at least one dielectric material, each of the first nanostructures comprising a portion of dielectric material arranged between two portions of metallic material such that one of the two portions of metallic material is arranged between the substrate and the portion of dielectric material, forming a first filter capable of making a passband filter in the visible range,
  make a plurality of second nanostructures at a uniform spacing from each other and located on the substrate, each of the second nanostructures comprising a portion of dielectric material of which only one face is in contact with a portion of metallic material, forming a second filter capable of making a passband filter in the infrared range.

The first nanostructures and the second nanostructures may be made using the following steps:
  deposit a stack of layers on the substrate, comprising a first metallic layer, a first dielectric layer and a second metallic layer,
  etch a part of the second metallic layer covering a part of the first dielectric layer that will form part of the portions of dielectric material of the second nanostructures,
  deposit a second layer of dielectric material, at least on said part of the first dielectric layer,
  etch the first metallic layer, the first dielectric layer and the second metallic layer such that remaining portions of these layers form the first nanostructures,
  etch the first metallic layer, said part of the first dielectric layer and the second dielectric layer such that remaining portions of these layers form the second nanostructures.

Such a spectral filtering device can be made using steps compatible with a CMOS type method.

BRIEF DESCRIPTION OF THE DRAWINGS

This invention will be better understood after reading the description of example embodiments given purely for information and in no way limitative with reference to the appended drawings in which.

Identical, similar or equivalent parts of the different figures described below are assigned the same numeric references to facilitate comparison of the different figures.

The different parts shown on the figures are not necessarily all at the same scale, to make the figures more easily understandable.

It must be understood that the different possibilities (variants and embodiments) are not mutually exclusive and may be combined with each other.

DETAILED PRESENTATION OF PARTICULAR EMBODIMENTS

Figure 1:
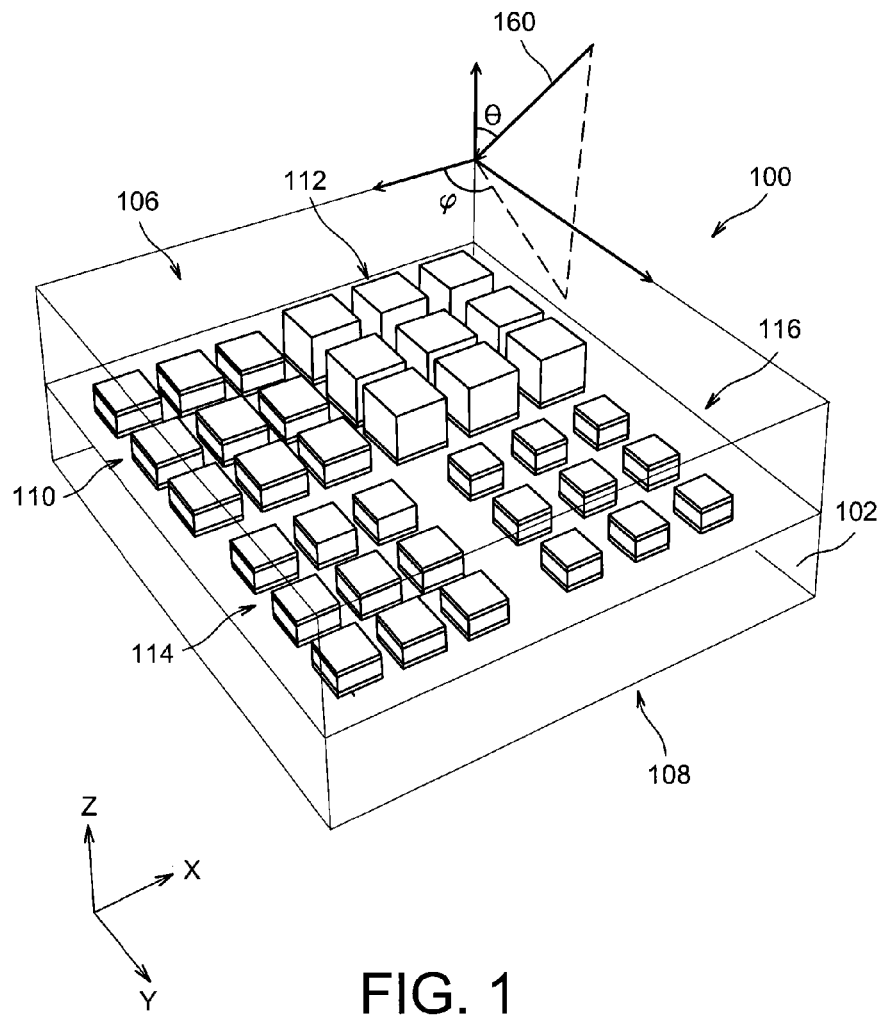
FIGS. 1 and 2 represent a spectral filtering device according to a first embodiment.

Refer firstly to FIG. 1 that diagrammatically represents a part of a spectral filtering device 100 according to a first embodiment.

The device 100 comprises a substrate 102 comprising a dielectric material, for example $SiO_2$. The substrate 102 is transparent to light filtered by the device 100.

The device 100 also comprises nanostructures, also called plasmonic nanostructures, made on the substrate 102 and that will form filters capable of spectral filtering of light received by the device 100 through the generation of surface plasmons. The substrate 102 and the nanostructures are covered by a superstrate 104 in this case also comprising a dielectric material, for example a material similar to the material of the substrate 102, in this case $SiO_2$. Materials other than $SiO_2$ may be used to make the substrate 102 and the superstrate 104, such as materials with a low refraction index, for example between about 1 and 1.7, such as $MgF_2$. The use of materials with a higher refraction index could also be envisaged if the nanostructures were resized, for example such that the nanostructure dimensions are all increased in proportion to the ratio between this high refraction index and the refraction index of the current material such as $SiO_2$.

The superstrate 104 is transparent to light received by the device 100 and that will be filtered. The thickness of the superstrate 104 may be equal to or more than the thicknesses of the thickest nanostructures of the device 100. On the example shown in FIG. 1, the device 100 will receive light entering through a front face 106 of the superstrate 104, this light then being filtered by the filters formed by the nanostructures located on the substrate 102. Filtered light exits from the device 100 through a rear face 108 of the substrate 102 opposite the face of the substrate 102 on which the nanostructures are made.

In the example of FIG. 1, the device 100 comprises four filters 110, 112, 114 and 116, each formed by a plurality of nanostructures at uniform spacing from each other. The dimensions of the nanostructures of filters 110 to 116 are different and the spacing between them is different in each of the filters 110-116.

Each of the filters 110 to 116 can act as a passband filter in a range or wavelengths different from the wavelengths that will be filtered by the other filters. Each of the three filters 110, 114 and 116 can act as a passband filter in the visible range, while the filter 112 can act as a passband filter in the near infrared range, in other words in the range of wavelengths between about 750 nm and 1500 nm. In the example described herein, the first filter 110 can act as a passband filter for wavelengths corresponding to the colour blue, in other words with a transmission of between about 40% and 55% for wavelengths between about 400 nm and 500 nm. The second filter 112 can act as a passband filter in the near infrared range, in other words with a transmission of more than about 50%, and for example close to 90%, for part of the wavelengths in the near infrared range. The third filter 114 can act as a passband filter for wavelengths corresponding to the colour green, in other words with a transmission of between about 40% and 55% for wavelengths between about 500 nm and 600 nm. Finally, the fourth filter 116 can act as a passband filter for wavelengths corresponding to the colour red, in other words with a transmission of between about 40% and 55% for wavelengths between about 600 nm et 700 nm.

In this case, the four filters 110 to 116 are arranged in the form of a 2×2 matrix, for example corresponding to four RGB-IR filters in a Bayer matrix modified for example as described in document EP 2 367 359 A2 (the difference from a 2×2 matrix for filters in a classical Bayer matrix is that one of the two green filters is replaced by an infrared filter).

The nanostructures in each of the filters 110-116 are laid out uniformly alongside each other on the substrate 102, forming a uniform lattice of nanostructures. Thus, in the diagrammatic example in FIG. 1, each of the filters 110-116 comprises nine nanostructures with a uniform spacing between them and laid out in the form of a 3×3 square matrix. In general, each filter may comprise between 9 and 25 nanostructures depending on the pixel size of the associated detector. The lateral dimensions (along the X and Y axes shown in FIG. 1), the height (dimension along the Z axis in FIG. 1) and the space between the nanostructures in each filter 110-116 are such that the range of wavelengths filtered by each filter 110-116 can be defined. In this first embodiment, each nanostructure in filters 110-116 is rectangular parallelepiped shaped and has a rectangular section in a plane parallel to the principal plane of the substrate 102 (corresponding to the (X,Y) plane in FIG. 1). In one variant embodiment, the nanostructures may have a rectangular section with rounded corners in a plane parallel to the principal plane of the substrate 102. In another variant, the nanostructures may have different shapes such as polyhedrons, cylinders, etc.

Figure 2:
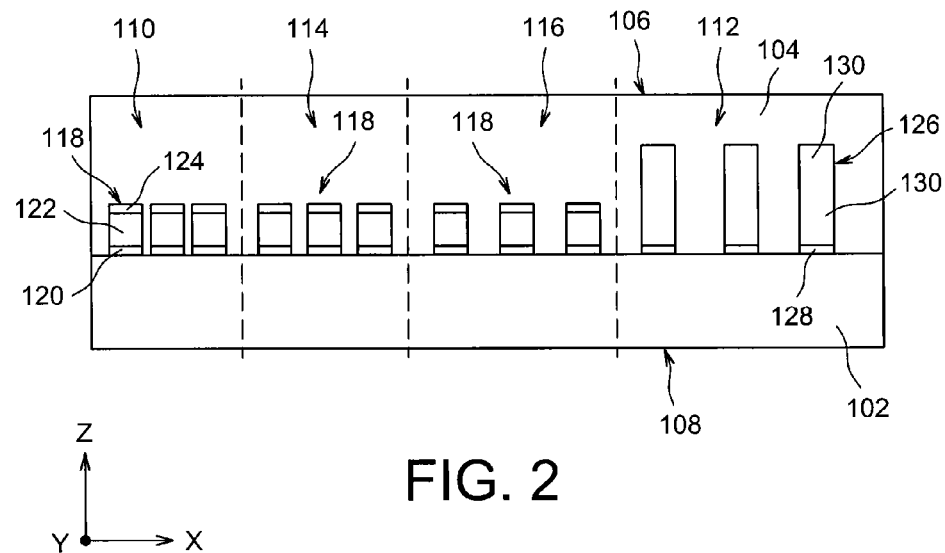

FIG. 2 diagrammatically represents a cross-sectional side view of nanostructures of filters 110-116 formed on the substrate 102 (the four filters 110-116 are shown adjacent to each other to simplify the diagram, although in fact they are laid out as a 2×2 matrix as shown in FIG. 1). The nanostructures of filters 110, 114 and 116 that can form a passband filter in the visible range are called first nanostructures, and the nanostructures of the second filters 112 are called second nanostructures.

Each of the first nanostructures 118 of the three filters 110, 114 and 116 comprises a first portion of metallic material 120 located on the substrate 102, a portion of dielectric material 122 and a second portion of metallic material 124 such that the portion of dielectric material 122 is arranged between the two portions of metallic materials 120 and 124. Each first nanostructure 118 forms an MIM (<<Metal-Insulator-Metal>>) type pad. The metallic materials could also be replaced by non-metallic electrically conducting materials.

The heights, or thicknesses, of the first nanostructures 118 of the filters 110, 114 and 116 are similar in each filter. Moreover, in the example in FIG. 2, the lateral dimensions (along the X and Y axes) of the first nanostructures 118 are similar in the three filters 110, 114 and 116. Thus, in the device 100, the differences between spectral filtering done by the filters 110, 114 and 116 are obtained by varying the spacing between the first nanostructures in each of the filters 110, 114 and 116.

The second nanostructures 126 of the second filter 112 are structurally different from the first nanostructures 118 of the first filters 110, 114 and 116. Thus, each of the second nanostructures 126 comprises a first portion of metallic material 128, for example similar to the first portion of metallic material 120, on which there is a portion of dielectric material 130 with a thickness different from the portion of dielectric material 122 in the first nanostructures 118. Furthermore, unlike the first nanostructures 118, the second nanostructures 126 do not comprise a second portion of metallic material arranged on the portion of dielectric material 130. As a variant, each of the second nanostructures 126 could have the portion of dielectric material 130 arranged on the substrate 102 directly and covered by a portion of metallic material, for example similar to the portion of metallic material 128.

The portions of metallic material 120, 124 and 128 of the nanostructures in this case comprise aluminium and each has a thickness (dimension along the Z axis) between about 30 nm and 70 nm. As a variant, these portions of metallic material 120, 124 and 128 could be made of gold and/or silver. The portions of dielectric material 122 comprise for example SiN and their thickness is between about 75 nm and 100 nm. The portions of dielectric material 130 comprise for example SiN and their thickness is between about 250 nm and 325 nm. Advantageously, the thickness of each of the nanostructures of a filter is less than the shortest wavelength of the spectral band that the filter can allow to pass. As a variant, the portions of dielectric material 122 and 130 may be made from SiN and/or TiO$_2$ and/or any other dielectric material with a refraction index of between about 2 and 2.5.

Figures 3A, 3B:
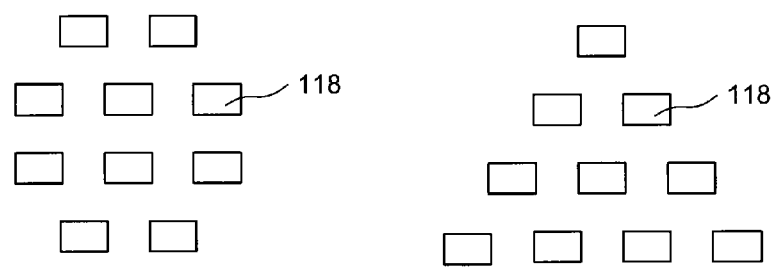
FIGS. 3A, 3B and 4 show example configurations of nanostructures within a filter of the spectral filtering device according to a particular embodiment.

In one variant embodiment, the nanostructures of one filter could be laid out adjacent to each other in a manner other than a square or rectangular matrix, for example in hexagonal form as shown on the example in FIG. 3A, or in triangular form as shown on the example in FIG. 3B, or in any other form that can give a uniform space between the nanostructures, both for filters 110, 114 and 116 for the visible range and for the second filter 112 for the infrared range.

Figure 4:
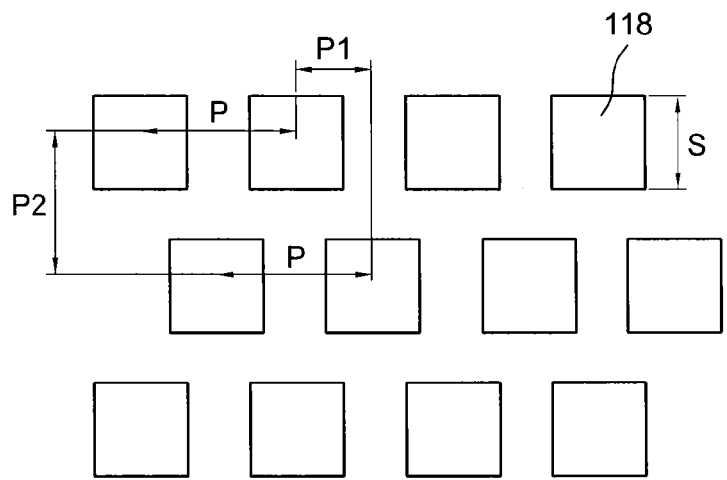

FIG. 4 also shows another example layout of nanostructures within one of the filters of the device 100. In this example, the nanostructures 118 (or equally the second nanostructures 126) are laid out adjacent to each other in rows parallel to each other. The distance P, called the period, represents the distance between the centres of two adjacent nanostructures located in the same row. The distance P1 represents the offset between two nanostructures laid out one above the other (belonging to two adjacent rows) which, when P1 is zero, are in line one above the other (the value of P1 is between 0 and P). P2 represents the distance between the centres of two nanostructures one above the other. When P1 is zero or equal to P and P2 is equal to P, the nanostructures are laid out in the form of a square or rectangular matrix as on the example in FIG. 1. When P1 is equal to 0.5 P and P2 is equal to P, the nanostructures are staggered. The distance P is also advantageously chosen such that it is less than the shortest wavelength that can be filtered by the filter containing nanostructures with a spacing equal to this distance P.

In another variant embodiment of the device 100, the filters 110, 114 and 116 may be capable of filtering bands with wavelengths different from those corresponding to the colours blue, green and red. Considering the example in FIG. 4, if S is defined as being the side dimension of one of the nanostructures (in this case with a square section), a fill factor can be defined equal to the S/P ratio. If this fill factor is chosen to be between about 0.4 and 0.95, passband filters can be made with relatively narrow filter bands, for example between about 30 nm and 100 nm. It is also possible that the nanostructures of the different filters in a spectral filtering device are made with a fill factor of similar value.

Figure 5:
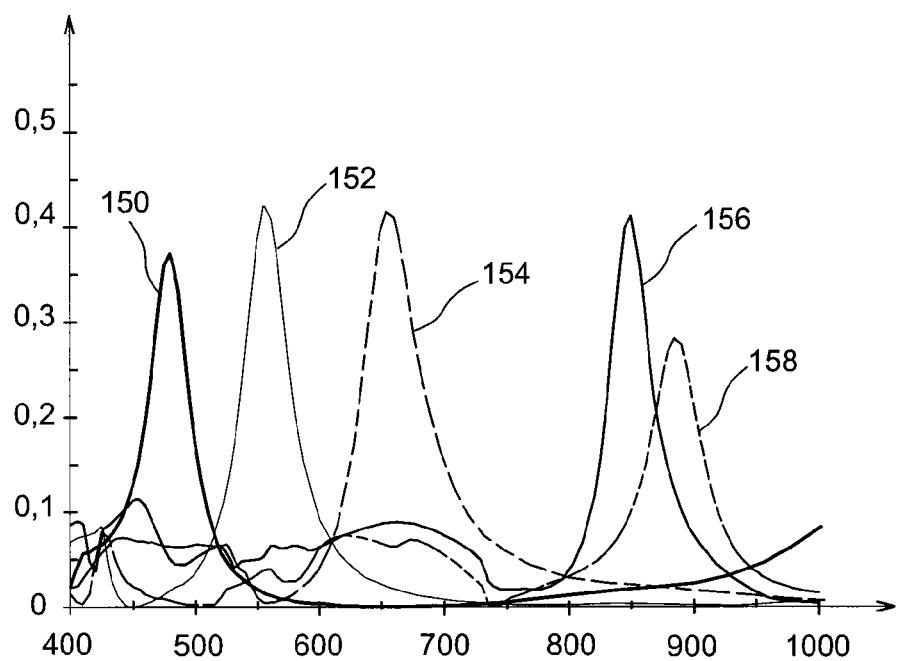
FIGS. 5 to 7 show spectral responses obtained with filters of the spectral filtering device according to a particular embodiment.

FIG. 5 shows the spectral responses 150, 152, 154 and 156 (transmission as a function of the wavelength) obtained from filters 110, 114, 116 and 112 respectively of the device 100, making nanostructures with a fill factor equal to about 0.7, portions of aluminium 120, 124 and 128 with a thickness equal to about 50 nm, portions of SiN 122 with a thickness equal to about 100 nm, portions of SiN 130 with a thickness equal to about 300 nm, a substrate 102 and a superstrate 104 which are SiO$_2$-based. The dimension S of the first nanostructures 118 of the first filter 110 is equal to about 165 nm and they are spaced with a distance P equal to about 240 nm. The dimension S of the first nanostructures 118 of the third filter 114 is equal to about 205 nm and they are spaced with a distance P equal to about 290 nm. The dimension S of the first nanostructures 118 of the fourth filter 116 is equal to about 255 nm and they are spaced with a distance P equal to about 360 nm. Finally, the dimension S of the second nanostructures 126 of the second filter 112 is equal to about 365 nm and they are spaced with a distance P equal to about 500 nm. For comparison, a curve 158 shown in FIG. 5 corresponds to the spectral response obtained for a filter which is substantially similar to the second filter 112, but in which the dielectric portions of the nanostructures have not only one face arranged against a portion of metallic material, but two opposite faces arranged against portions of metallic material (MIM structure). This shows that the IM structure (with only one side of the dielectric portions disposed against portions of metal) of the second nanostructures of the second filter 112 allows, compared to the infrared filter with MIM nanostructures, to have a greater transmission peak.

The values of transmission peaks and the ranges of filtered wavelengths are not the only parameters that determine the performances of the spectral filtering device 100. Depending on the envisaged application, it might be desirable that the spectral characteristic of the filter does not vary as a function of the angle of incidence of light arriving at the input face 106 of the superstrate 104 (angle that can easily vary by 20° or even 30° when the device 100 is used in an imaging device) and the polarisation state. Thus, in the example in FIG. 1, a light beam 160 arrives on the front face 106 of the superstrate 104 forming an angle θ from the normal to this front face 106, and an angle φ relative to a nanostructures alignment axis, in this case the X axis. Therefore θ in this case is equal to the angle of incidence relative to the normal to the surface, while φ determines the azimuth direction of the incidence.

Figure 6:
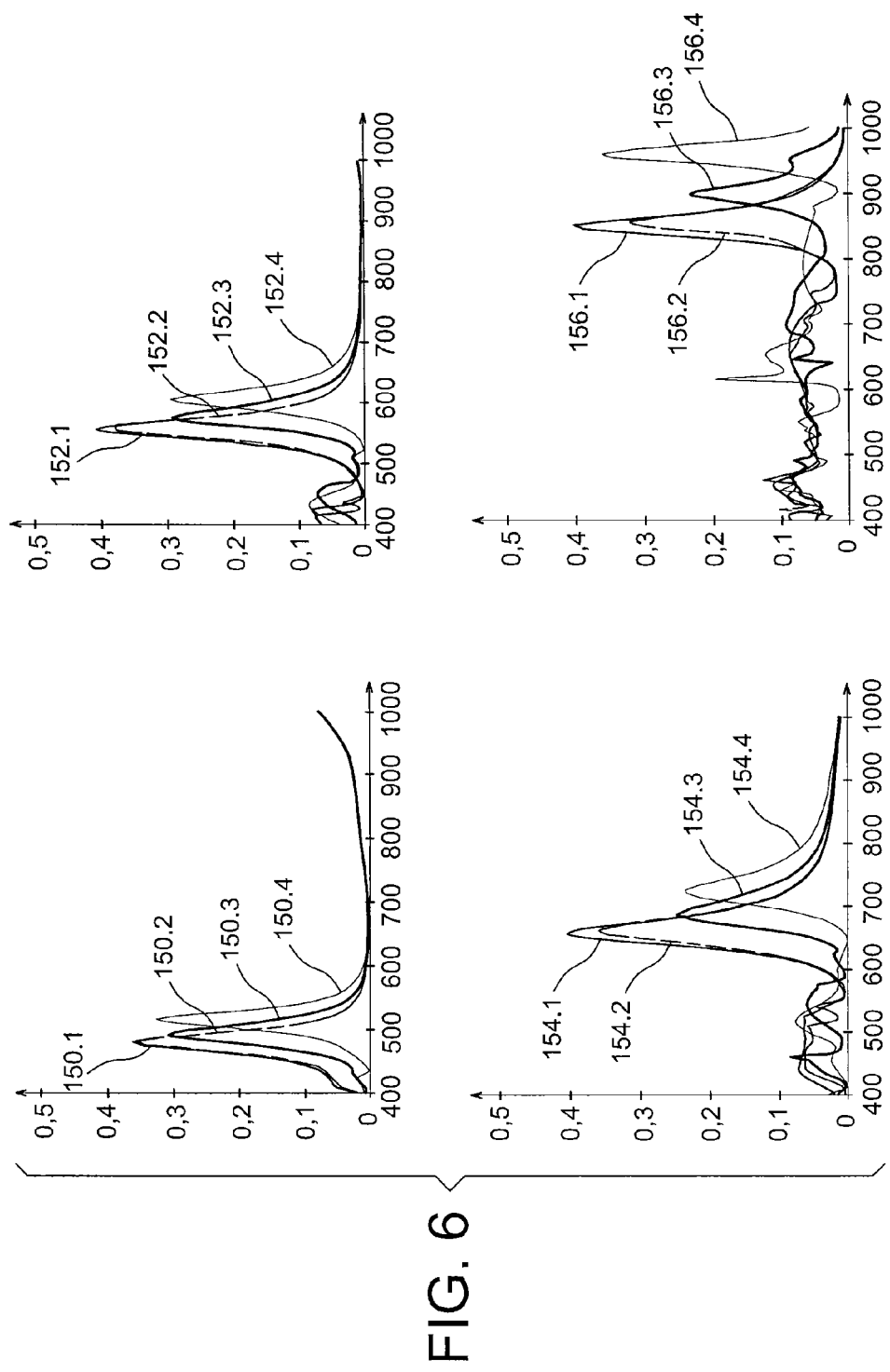

FIG. 6 represents different spectral responses obtained respectively from filters 110, 114, 116 and 112 similar to the filters used to obtain spectral responses 150-156 shown in FIG. 5. The curves 150.1, 152.1, 154.1 and 156.1 shown in FIG. 6 correspond to the spectral responses 150-156, and to the case in which the angles θ and 4 are zero.

The curves 150.2, 152.2, 154.2 and 156.2 correspond to the spectral responses of these same filters, but with angles θ=6° and φ=15°. Similarly, curves 150.3, 152.3, 154.3 and 156.3 correspond to the spectral responses of these same filters, but with angles θ=13° and φ=30°.

Finally, the curves 150.4, 152.4, 154.4 and 156.4 correspond to the spectral responses of these same filters but for angles θ=20° and φ=45°.

Therefore it can be seen from these curves that an increase in the angle of incidence of the light beam on the input face of the device will shift the peak of the spectral response towards the right, in other words towards longer wavelengths, and that this is applicable to all filters.

Thus, when the spectral filtering device 100 is designed for use in a system that can receive light beams at a certain angle of incidence from the input face, filter characteristics (dimensions of nanostructures, fill factor, etc.) could be determined taking account of the value of this angle of incidence. Furthermore, it can be seen that the structures of filters are capable of compensating a certain angle of incidence, in other words filters can tolerate a certain angle of incidence, for example up to θ=+/−20°, without their spectral response being significantly modified when φ varies.

Figure 12A:
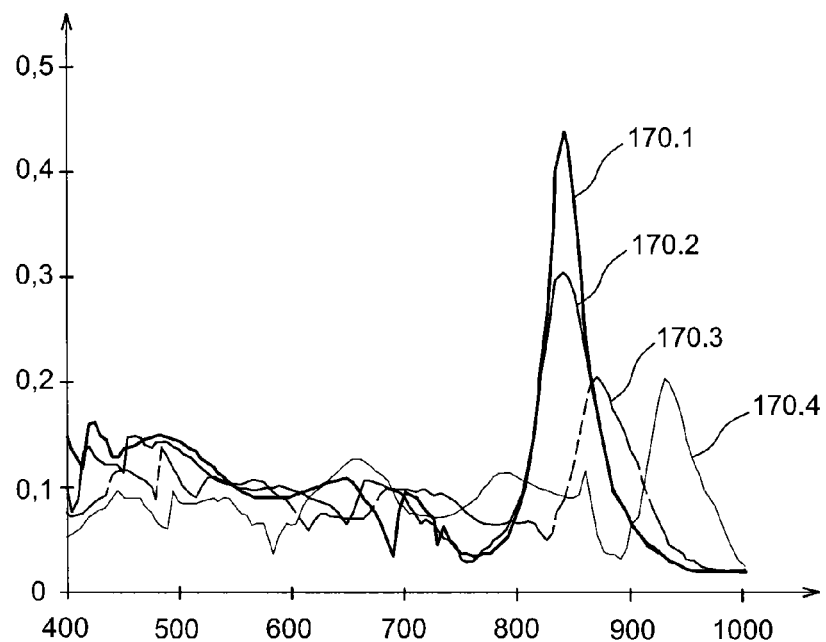
FIGS. 12A and 12B show spectral responses obtained respectively with the second filter with 1M type nanostructures and with an infrared filter with MIM type nanostructures, for different incidence angles.

Curves 170.1, 170.2, 170.3 and 170.4 shown in FIG. 12A represent the transmission coefficient obtained as a function of the wavelength with the second filter 112 having the IM type second nanostructures (one side of the dielectric portions in contact with metallic portions) for the following angles:

curve 170.1: φ=0°, θ=0°;
curve 170.2: φ=15°, θ=6°;
curve 170.3: φ=30°, θ=13°;
curve 170.4: φ=45°, θ=20°.

It can be seen in FIG. 12A that for these values of angles θ and φ, the transmitted signal is detectable with respect to noise, that is the parts of the signal outside the range of wavelengths where is the transmission peak, because these transmission peaks have values which are greater than the transmission at the others wavelengths.

Figure 12B:
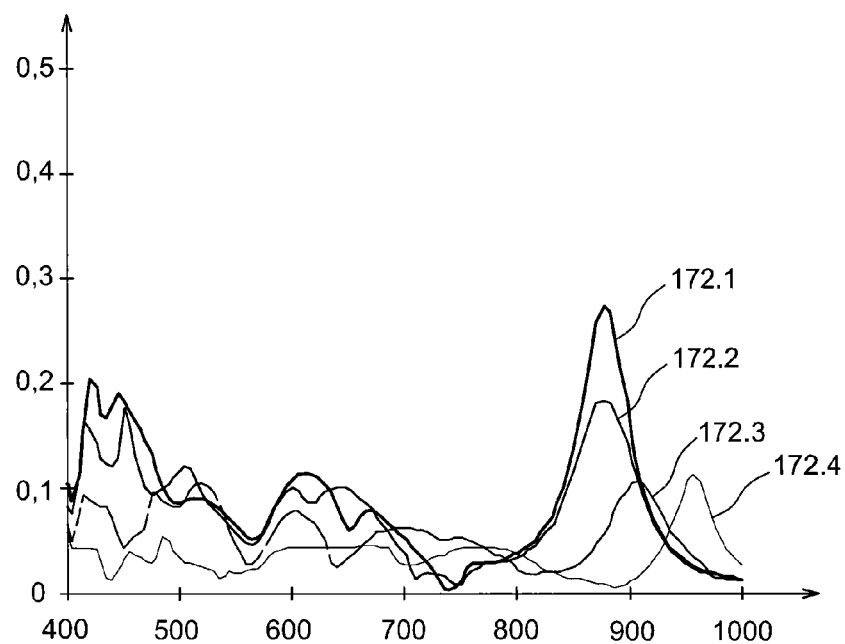

For comparison, curves 172.1, 172.2, 172.3 and 172.4 shown in FIG. 12B correspond to the transmission coefficient obtained as a function of the wavelength for a filter which is substantially similar to the second filter 112, but comprising nanostructures with portions of dielectric material having not only one face arranged against a portion of metallic material, but with two opposite faces arranged against portions of metallic material (MIM structure) for the following angles:

curve 172.1: φ=0°, θ=0°;
curve 172.2: φ=15°, θ=6°;
curve 172.3: φ=30°, θ=13°;
curve 172.4: φ=45°, θ=20°.

Unlike the second filter 112, shown here that if φ and θ are not zero, the transmission peaks obtained are at the same level or less than the noise, and it is thus not possible to recover the transmitted signal corresponding to this peak when MIM type nanostructures are used for such angles in an infrared filter.

Figure 7:
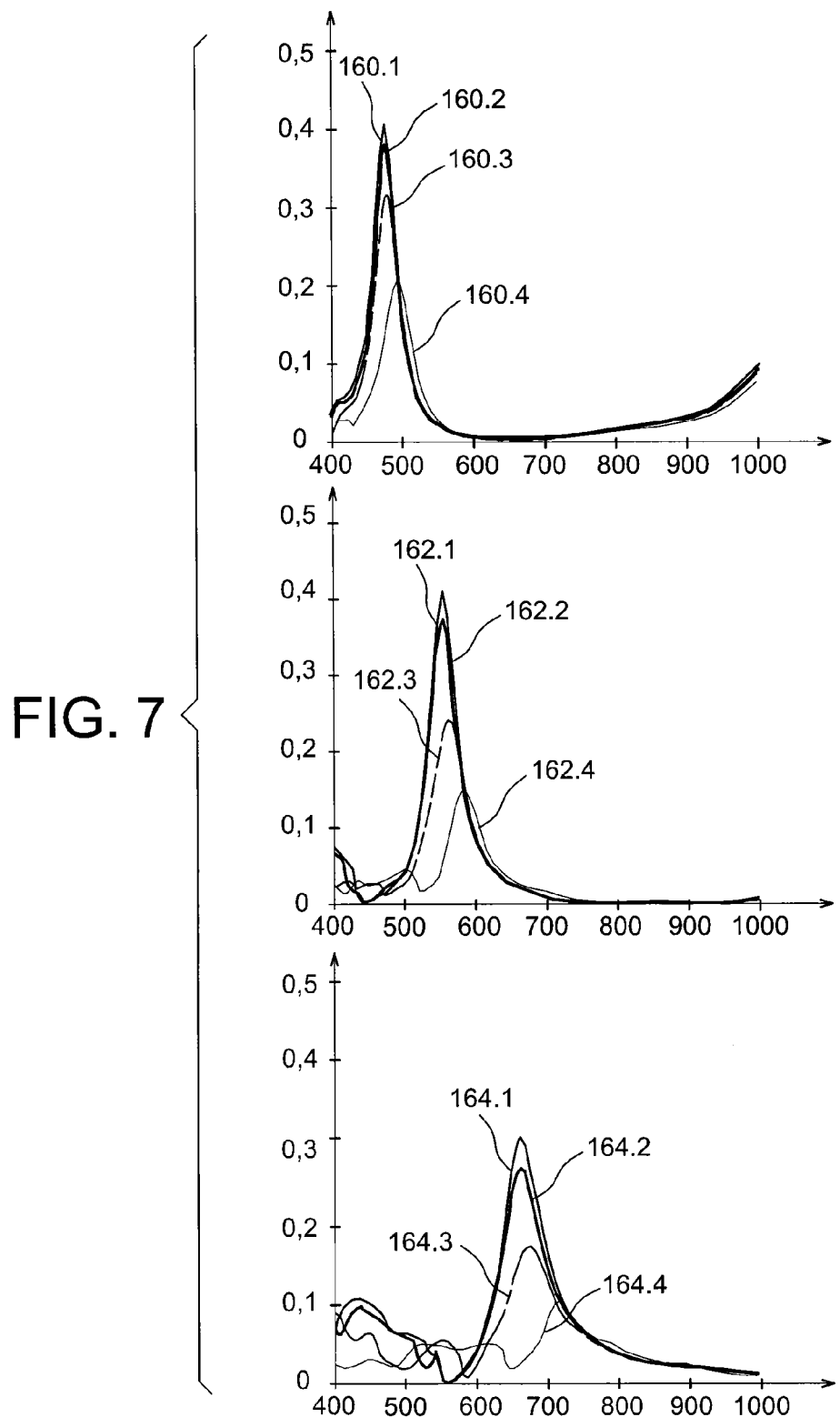

The curves 160.1, 162.1 and 164.1 shown in FIG. 7 correspond to the spectral responses of filters similar to those used to obtain spectral responses 150.1, 152.1 and 154.1, except for the value of P1 that in this case is equal to 0.5 P, and corresponding to the case in which the angles θ and φ are zero. The curves 160.2, 162.2 and 164.2 correspond to the spectral responses of these filters, but with angles θ=6° and φ=15°. Similarly, the curves 160.3, 162.3 and 164.3 correspond to the spectral responses of these same filters, but with angles θ=13° and φ=30°. Finally, curves 160.4, 162.4 and 164.4 correspond to the spectral responses of these same filters, but with angles θ=20° and φ=45°.

During the design of the spectral filtering device, the values of periods, in other words the distance between the centres of two neighbouring nanostructures located in the same row of a filter, and fill factors of nanostructures in each filter may be determined from a first and a second three-dimensional diagram obtained by an RCWA («Rigorous Coupled Wave Analysis») type simulation, giving the value of the transmission peak of the filter and the value of the transmitted wavelength at this transmission peak depending on the period of the nanostructures and the fill factor of the filter nanostructures, respectively, for a given shape of nanostructures (for example for rectangular shaped nanostructures). The value of the wavelength of the transmission peak is firstly chosen on the second diagram, thus providing a set of values of the period and the fill factor for which the transmission peak of the filter is at the chosen wavelength. This set of values of the period and the fill factor is then transferred onto the first diagram. The values that give the most appropriate value of the transmission peak are then chosen from among the set of values transferred onto the first diagram, for example the highest value if it is required to maximise transmission of the filter at this wavelength. This procedure is repeated for each filter in the spectral filtering device.

The diagrams described above and used to size the near infrared filter are different from those used to size filters in the visible range because the structure of the second nanostructures 126 is different from the structure of the first nanostructures 118.

For example, for filters with rectangular parallelepiped shaped nanostructures laid out as a square matrix, a blue colour filter can be obtained by making first nanostructures of this filter with a period of between about 200 nm and 280 nm and a fill factor of between about 0.6 and 0.78. Similarly, a green colour filter can be obtained by making first nanostructures of this filter with a period of between about 280 nm and 330 nm and a fill factor of between about 0.6 and 0.78. A red colour filter can be obtained by making first nanostructures of this filter with a period of between about 340 nm and 410 nm and a fill factor of between about 0.7 and 0.78. Finally, a near infrared filter can be obtained by making the second nanostructures of the filter with a period of between about 600 nm and 780 nm and a fill factor of between about 0.65 and 0.725.

Figure 8:
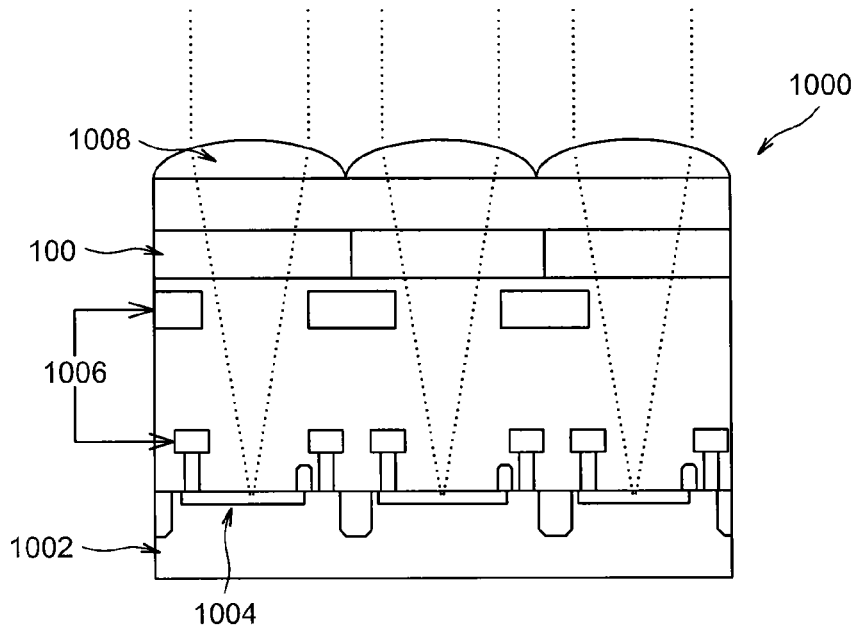
FIGS. 8 to 10 show example embodiments of an imaging device according to particular embodiment.

The previously described spectral filtering device is advantageously used within an imaging device 1000 like that shown in FIG. 8.

The imaging device 1000 comprises a substrate 1002 in which photodetectors 1004 are made, in this case of the CMOS type. Metallic interconnection layers 1006 are made above photodetectors 1004 (the imaging device 1000 in this view is of the front-side type). The spectral filtering device 100 is arranged above the metallic interconnection levels 1006, under microlenses 1008. FIG. 8 shows only two levels of metallic interconnections 1006, for reasons of clarity on the figure. In such an imaging device 1000, light to be captured passes firstly through the microlenses 1008 that focus light beams towards the photodetectors 1004. Before light reaches the photodetectors 1004, it is filtered by the spectral filters of the device 100. For example, each photodetector 1004 is facing one of the filters of the spectral filtering device 100.

Figure 9:
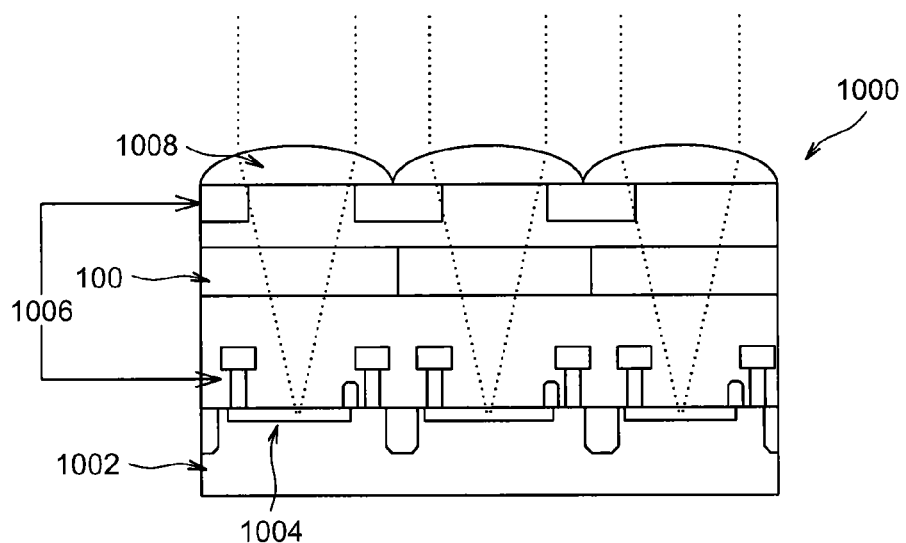

In one variant embodiment shown in FIG. 9, the spectral filtering device may be located within the levels of metallic interconnections 1006, between two of these levels, rather than between the microlenses 1008 and the last level of metallic interconnections 1006.

Figure 10:
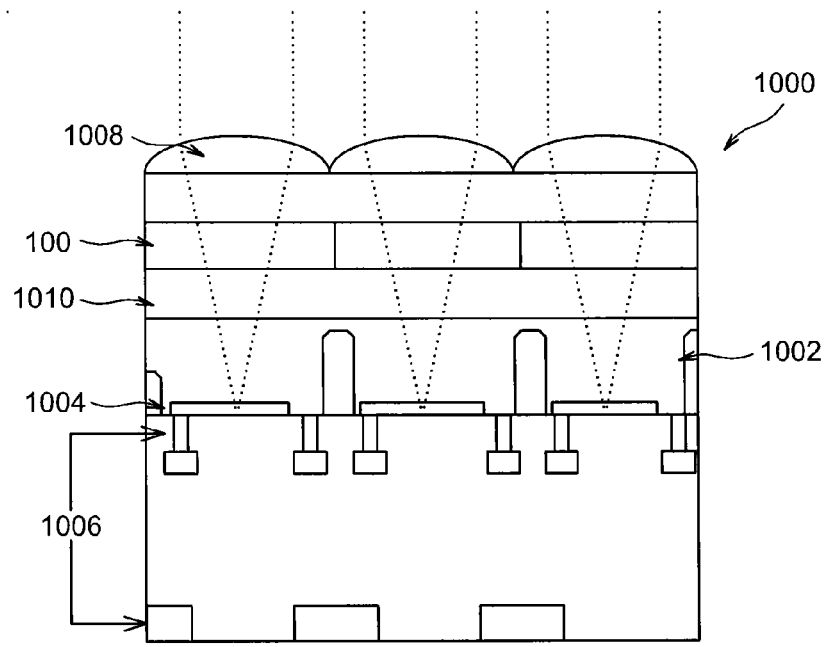

FIG. 10 shows another variant embodiment of the imaging device 1000. In this variant, the imaging device 1000 is of the back-side type, the metallic interconnection levels being located at the back face of the imaging device 1000. The spectral filtering device is separated from the photodetectors 1004 by a dielectric layer 1010 that may be between 0 and approximately 1 μm thick.

We will now describe the steps of a method of making the spectral filtering device 100 in this case corresponding to the example embodiment described above with reference to FIG. 1, with reference to FIGS. 11A to 11F.

Figure 11A:
FIGS. 11A to 11F show steps in a method of making a spectral filtering device according to invention particular embodiment.

As shown in FIG. 11A, the first step is to deposit a stack of layers on the substrate 102, comprising a first metallic layer 202, a first dielectric layer 204 and a second metallic layer 206. In this example embodiment, the two metallic layers 202 and 206 are composed of aluminium, and the dielectric layer 204 is composed of SiN. The thicknesses of these layers are chosen to correspond to the required thicknesses of the portions 120, 122 and 124, for example the values previously described for the device 100 in FIG. 1.

Figure 11B:
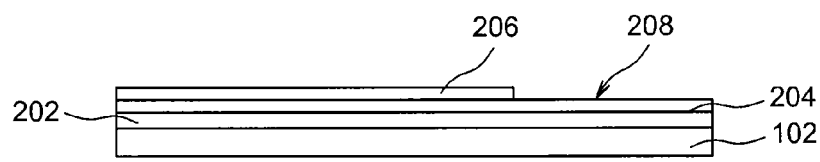
Figure 11C:
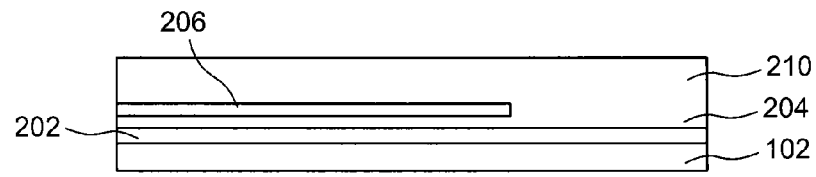
Figure 11D:
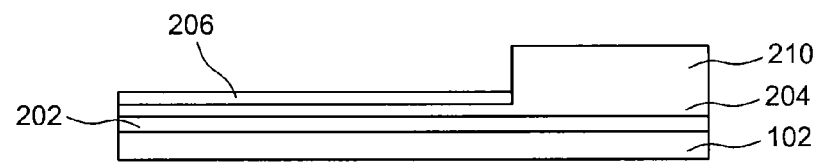

As shown in FIG. 11B, part of the second metallic layer 206 covering a part 208 of the first dielectric layer 204 that will form part of the portions of dielectric material of the second nanostructures 126, is etched. The next step is to deposit a second layer of dielectric material 210 that, with the deposit of the first dielectric layer 204, will subsequently form the dielectric portions 130 of the second nanostructures 126. In this case the second dielectric layer 210 comprises SiN, similar to the material of the first dielectric layer 204 (FIG. 11C). The nature of the material of the second dielectric material 210 in this case is the same as the nature of the material in the layer 204 and therefore merges with the part 208 of the previously exposed layer 204. The second layer of dielectric material 210 is then planarised until reaching the required thickness of the dielectric portions 130. The part of this second layer of dielectric material 210 that covers the remaining part of the second metallic layer 206 is then eliminated (see FIG. 11D).

Photolithography and etching steps of the second metallic layer 206, the first dielectric layer 204 and the first metallic layer 202 are then carried out such that the remaining portions of these layers form the first nanostructures 118 of the filters 110, 114 and 116.

Figure 11E:
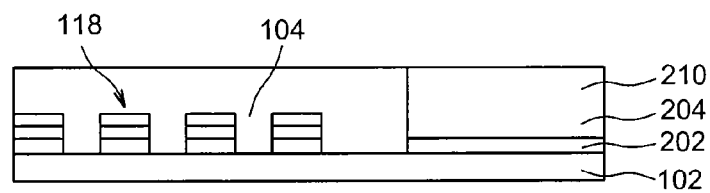

A dielectric deposit, in this case SiO$_2$, is then carried out. This dielectric is then planarised stopping on the remaining portion of the second layer of dielectric material 210, thus forming the part of the superstrate 104 covering the filters 110, 114 and 116 (FIG. 11E).

Figure 11F:
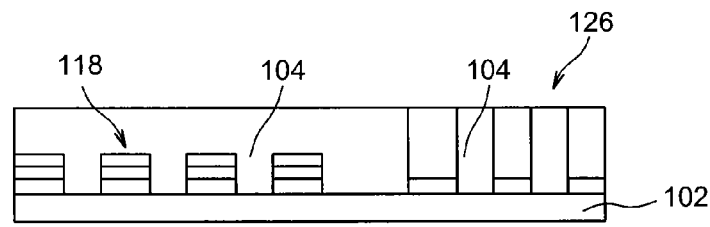

The second filter 112 is then completed by photolithography and etching steps through the remaining portion of the second layer of dielectric material 210, the part 208 of the first dielectric layer and the first metallic layer 202, such that remaining portions of these layers 202, 204 and 210 form the second nanostructures 126. The superstrate 104 is then completed by making a deposit of dielectric (SiO$_2$) on the second nanostructures 126, again including planarisation stopping on the tops of the nanostructures 126 (FIG. 11F).

The invention may be advantageously used to make:
imaging devices, for example such as surveillance cameras;
digital display devices (for example for making primary colour filters, or to separate colours at the back of an LCD display unit);
hyperspectral imaging system;
colour projection system.

The invention claimed is:

1. A spectral filtering device comprising at least:
a substrate comprising at least one dielectric material;
a first filter acting as a passband filter in the visible range and comprising a plurality of first nanostructures with a uniform spacing between each other and arranged on the substrate, each of the first nanostructures comprising a portion of dielectric material arranged between two portions of metallic material such that one of the two portions of metallic material is arranged between the substrate and the portion of dielectric material;
a second filter acting as a passband filter in the infrared range and comprising a plurality of second nanostructures with a uniform spacing between each other and arranged on the substrate, each of the second nanostructures comprising a portion of dielectric material having a plurality of surfaces, of which only one surface is in contact with a portion of metallic material; and
a superstrate material provided over the first and second nanostructures such that the superstrate material is interposed between side surfaces of adjacent nanostructures.

2. A method of making a spectral filtering device, comprising at least the following steps:
making a plurality of first nanostructures, at a uniform spacing from each other on a substrate comprising at least one dielectric material, each of the first nanostructures comprising a portion of dielectric material arranged between two portions of metallic material such that one of the two portions of metallic material is arranged between the substrate and the portion of dielectric material, forming a first filter capable of making a passband filter in the visible range,
making a plurality of second nanostructures at a uniform spacing from each other and located on the substrate, each of the second nanostructures comprising a portion of dielectric material having a plurality of surfaces, of which only one surface is in contact with a portion of metallic material, forming a second filter capable of making a passband filter in the infrared range, and
providing a superstrate material over the first and second nanostructures such that the superstrate material is interposed between side surfaces of adjacent nanostructures.

3. The spectral filtering device according to claim 1, wherein at least one of the following conditions is satisfied:
the portions of metallic material of the first and the second nanostructures comprise aluminium, and
the portions of metallic material of the first and the second nanostructures are between about 30 nm and 70 nm thick.

4. The spectral filtering device according to claim 1, wherein at least one of the following conditions is satisfied:
the dielectric portions of the first and second nanostructures comprise SiN,
each of the dielectric portions of the first nanostructures are between about 75 nm and 100 nm thick, and
each of the dielectric portions of the second nanostructures are between about 250 nm and 325 nm thick.

5. The spectral filtering device according to claim 1, wherein the portions of metallic material arranged in contact with portions of dielectric material of the second nanostructures are arranged between the substrate and said portions of dielectric material.

6. The spectral filtering device according to claim 1, wherein at least one of the following conditions is satisfied:
one dimension of each of the first nanostructures that is perpendicular to a principal plane of the substrate is less than the shortest wavelength of the spectral band that the first filter can allow to pass, and
one dimension of each of the second nanostructures that is perpendicular to the principal plane of the substrate is less than the shortest wavelength of the spectral band that the second filter can allow to pass.

7. The spectral filtering device according to claim 1, in which wherein at least one of the following conditions is satisfied:
the first nanostructures are each rectangular parallelepiped shaped, and
the second nanostructures are each rectangular parallelepiped shaped.

8. The spectral filtering device according to claim 1, wherein at least one of the following conditions is satisfied:
the first nanostructures are laid out side by side on the substrate, within their corresponding filters, in the form of rows parallel to each other, and
the second nanostructures are laid out side by side on the substrate, within their corresponding filters, in the form of rows parallel to each other.

9. The spectral filtering device according to claim 1, wherein at least one of the following conditions is satisfied:
the distance between the centres of two neighbouring first nanostructures is less than the shortest wavelength of the band that the first filter can allow to pass, and
the distance between the centres of two neighbouring second nanostructures is less than the shortest wavelength of the band that the second filter can allow to pass.

10. The spectral filtering device according to claim 1, further comprising a third filter acting as a passband filter in the visible range and comprising a plurality of third nanostructures at a uniform spacing from each other and located on the substrate, each of the third nanostructures comprising a portion of dielectric material arranged between two portions of metallic material such that one of the two metallic portions is arranged between the substrate and the portion of dielectric material, and in which the band of wavelengths that the third filter allows to pass is different from the band of wavelengths that the first filter allows to pass.

11. The spectral filtering device according to claim 10, further comprising a fourth filter acting as a passband filter in the visible range and comprising a plurality of fourth nanostructures at a uniform spacing from each other and arranged on the substrate, each of the fourth nanostructures comprising a portion of dielectric material arranged between two portions of metallic material such that one of the two metallic portions is arranged between the substrate and the portion of dielectric material, and in which the band of wavelengths that the fourth filter allows to pass is different from the band of wavelengths that the first and third filters allows to pass.

12. The spectral filtering device according to claim 1, further comprising a layer of dielectric material covering the first nanostructures and the second nanostructures arranged on the substrate.

13. An imaging device comprising at least one spectral filtering device according to claim 1, and further comprising a plurality of photodetectors each facing a filter of the spectral filtering device.

14. The method according to claim 2, wherein the first nanostructures and the second nanostructures are made using the following steps:
depositing a stack of layers on the substrate, comprising a first metallic layer, a first dielectric layer and a second metallic layer,
etching a part of the second metallic layer covering a part of the first dielectric layer that will form part of the portions of dielectric material of the second nanostructures,
depositing a second layer of dielectric material, at least on said part of the first dielectric layer,
etching the first metallic layer, the first dielectric layer and the second metallic layer such that remaining portions of these layers form the first nanostructures, and
etching the first metallic layer, said part of the first dielectric layer and the second dielectric layer such that remaining portions of these layers form the second nanostructures.

15. The spectral filtering device according to claim 8, wherein at least one of the following conditions is satisfied:
the first nanostructures are laid out side by side on the substrate, within their corresponding filters, in the form of a rectangular or staggered matrix, and
the second nanostructures are laid out side by side on the substrate, within their corresponding filters, in the form of a rectangular or staggered matrix, wherein a staggered matrix includes an offset between two nanostructures of adjacent rows or adjacent columns.

16. The spectral filtering device according to claim 8, wherein at least one of the following conditions is satisfied:
when each of the first nanostructures is rectangular parallelepiped shaped, the ratio between a dimension of one side of a first nanostructure parallel to a principal plane of the substrate, and the distance between the centres of two neighbouring first nanostructures located in the same row is between about 0.4 and 0.95, and
when each of the second nanostructures is rectangular parallelepiped shaped, the ratio between a dimension of one side of a second nanostructure parallel to a principal plane of the substrate, and the distance between the centres of two neighbouring second nanostructures located in a same row is between about 0.4 and 0.95.

17. The spectral filtering device according to claim 11, wherein the first, third and fourth filters allows bands of wavelengths corresponding to the colours red, green and blue to pass.

* * * * *